United States Patent Office 3,216,978
Patented Nov. 9, 1965

3,216,978
POLYMERIZATION OF THIOCARBONYL COMPOUNDS WITH ALKYL-PEROXY BORANES AND ALKYL METAL COMPOUND
John M. Bruce, Jr., Wilmington, Del., assignor to E. I. du Pont de Nemours and Company, Wilmington, Del., a corporation of Delaware
No Drawing. Filed Apr. 18, 1962, Ser. No. 188,516
20 Claims. (Cl. 260—79)

This invention relates to a novel type of oxidation-reduction (redox) system and particularly to its use in initiating polymerization of thiocarbonyl compounds.

Recently it has been found that a variety of thiocarbonyl compounds can be polymerized by the action of suitable initiators. Both homopolymers of thiocarbonyl compounds and copolymers of thiocarbonyl compounds with other thiocarbonyl compounds and with ethylenically unsaturated compounds have been prepared. Examples of these polymerizations can be found in U.S. Patents 2,970,173, and 2,980,695 and French Patent 1,247,137. More recently, it has been found that such polymerizations can be carried out under less rigorous conditions and be made to yield polymers having superior properties by using an initiating system composed of a trihydrocarbyl-boron compound and oxygen. This invention is the subject of coassigned patent application S.N. 106,540, filed May 1, 1961. However, this system has the disadvantages that (1) induction periods are frequently observed before any polymerization occurs, and (2) even after polymerization has started, its rate is sometimes slow or irregular or both. The reasons for this behavior are believed to be retardation of addition polymerization by molecular oxygen, and the fact that the rate of participation by gaseous oxygen in the initiating system is controlled by its rate of diffusion through the medium, which rate may be slow.

It has now been found that polymerizable thiocarbonyl compounds can be polymerized to advantage, i.e., reproducibly and without retardation, by means of a new redox system comprising a hydrocarbylperoxyboron compound and a hydrocarbylmetal compound in the essential absence of moleculuar oxygen. It is to be understood that the term "polymerization" refers not only to homopolymerization of a single thiocarbonyl compound but also to polymerizations involving one or more other thiocarbonyl compounds or ethylenically unsaturated compounds. In accordance with the improved process of this invention, polymerization is effected simply by bringing the monomer or monomers and the components of the redox system into mutual contact at a temperature of −150° C. to 50° C.

The process of the present invention constitutes an improvement in the aforesaid process of application S. N. 106,540 and the known processes for polymerizing thiocarbonyl compounds referred to therein, e.g., the processes disclosed in the following patents and coassigned pending applications:

U.S. Patent No. 2,980,695 discloses methods of polymerizing thiocarbonyl fluoride

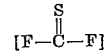

and thiocarbonyl chlorofluoride

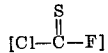

including their copolymerization with ethylenically unsaturated monomers, e.g., tetrafluoroethylene and vinyl fluoride.

French Patent No. 1,247,137 discloses methods of homopolymerizing α-fluorothioacyl fluorides and copolymerizing such fluorides with other copolymerizable monomers, e.g., other α-fluorothioacyl fluorides and ethylenically unsaturated monomers such as propylene. Examples of α-fluorothioacyl fluorides whose polymerization is disclosed therein are: chlorofluorothioacetyl fluoride

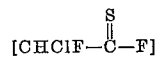

difluorothioacetyl fluoride

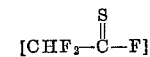

trifluorothioacetyl fluoride

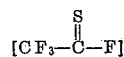

pentafluorothiopropionyl fluoride

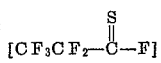

chlorodifluorothioacetyl fluoride

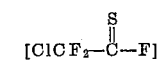

monofluorothioacetyl fluoride

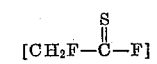

and α,α-difluorothiopropionyl fluoride

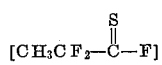

In U.S. Patent No. 2,970,173, methods of homopolymerizing polyfluorothioketones are disclosed. Examples of the thioketones whose polymerization is disclosed therein are: perfluorobutanethione

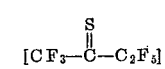

perfluoro-4-heptanethione

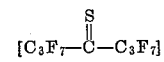

perfluoropropanethione

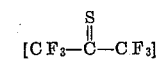

4H-heptafluoro-2-butanethione

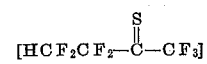

4-chloroheptafluoro-2-butanethione

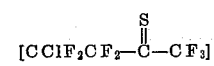

perfluorohexane-2-thione

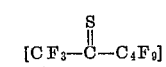

perfluoroheptane-2-thione

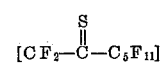

perfluorooctane-2-thione

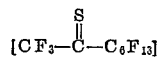

1,1,1,3,3-pentafluorobutane-2-thione

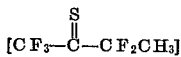

and trifluorothioacetophenone

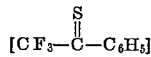

U.S. Patent No. 3,069,396 discloses methods of homopolymerizing polyfluorothioketones and copolymerizing such ketones with different polyfluorothioketones and copolymerizable monomers. Examples of the thioketones whose polymerization is disclosed therein are: perfluorobutanethione

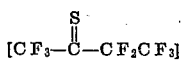

perfluoro-4-heptanethione

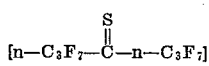

4H-heptafluoro-2-butanethione

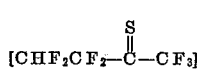

4-chloroheptafluoro-2-butanethione

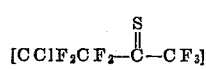

and perfluoropropanethione

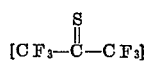

U.S. Patent No. 3,113,936 discloses methods of homopolymerizing fluorothioacyl chlorides and copolymerizing such chlorides with other copolymerizable monomers, e.g., different fluorothioacyl chlorides, thioacyl fluorides, fluorinated thioketones and ethylenically unsaturated monomers such as propylene and vinyl acetate. Examples of fluorothioacyl chlorides whose polymerization is disclosed therein are: trifluorothioacetyl chloride

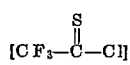

β-chlorotetrafluorothiopropionyl chloride

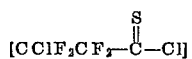

4-chlorooctafluorothiopentanoyl chloride

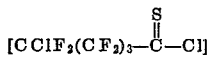

and β-hydrotetrafluoropropionyl chloride

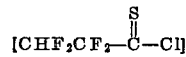

U.S. Patent No. 3,069,397 discloses methods of homopolymerizing α-fluorinated thioketones and copolymerizing them with other thiocarbonyl compounds. Examples of polymerizable thioketones disclosed therein are: 1,1,1-trifluorothioacetone

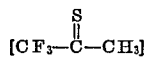

1,1,2,2-tetrafluoro-3-pentanethione

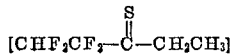

α,α,α-trifluorothioacetophenone

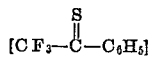

1,1-difluorothioacetone

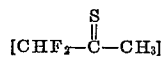

n-loweralkyl perfluoromethyl thioketones

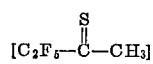

methyl perfluoroethyl thioketone

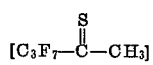

methyl perfluoropropyl thioketone

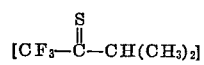

isopropyl perfluoromethyl thioketone

2H-perfluoro-n-butyl methyl thioketone

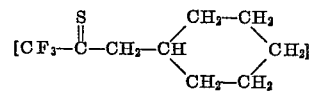

and cyclohexylmethyl perfluoromethyl thioketone

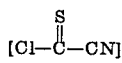

U.S. Patent No. 3,026,304 discloses methods of homopolymerizing thiocarbonyl chlorocyanide

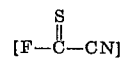

and thiocarbonyl fluorocyanide

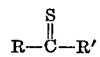

and copolymerizing these compounds with other thiocarbonyl monomers and ethylenically unsaturated monomers.

The improved process of this invention can be used to advantage in polymerizing any thiocarbonyl compound capable of addition polymerization and which will not react with the thiocarbonyl or ethylenically unsaturated comonomer in the absence of the initiator, e.g., any of the above-listed thiocarbonyl compounds are suitable.

Because they are more readily available, the preferred thiocarbonyl compounds for use in the process of this invention are those of the formula:

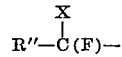

wherein R is a halogen of atomic number 9–17 (fluorine or chlorine) or

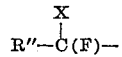

R' is fluorine, $$R''-\underset{\underset{\text{(F)}}{|}}{\overset{X}{C}}-$$

alkyl of up to seven carbon atoms or CN, with the provison that when R' is CN, R is chlorine or fluorine; R" is hydrogen, fluorine, chlorine, alkyl of 1–6 carbons or polyhaloalkyl of 1–6 carbons in which all halogens are of atomic number 9–17; and X is halogen of atomic number 9–17.

Most preferred are thiocarbonyl monomers in which R is chlorine, fluorine, or perhalomethyl or hydroperhalomethyl in which the halogens are of atomic number 9–17 and R' is fluorine or perfluoromethyl, particularly those in which R or R' is fluorine, because of the superior properties of the polymers obtained.

The range of ethylenically unsaturated compounds that can be used is extremely broad. As hereinafter used, the term, ethylenically unsaturated compound, includes any such compound which is capable of addition polymerization, and is free of acetylenic and allenic unsaturation and groups that react with the thiocarbonyl compound in the absence of the hydrocarbylboron compound and the oxidizing agent. The ethylenic unsaturation can be terminal, as in a vinyl or allyl group, or it can be internal; and there can be more than one such unsaturation per molecule. Suitable ethylenically unsaturated monomers include hydrocarbons (e.g., ethylene, 2-butene and 1-octene), halohydrocarbons (e.g., vinyl fluoride, allyl chloride, and 2,3-dicholoro-1,3-butadiene), ethers (e.g., 3,3-diethoxypropene), esters (e.g., vinyl acetate, allylidene acetate, 2-chloroethyl acrylate and allyl n-butyrate), nitriles (e.g., acrylonitrile), acid halides (e.g., allyl chloroformate), and silanes (e.g., vinyltrimethylsilane). Ethylenically unsaturated monomers of up to 8 carbon atoms are usually employed because they are readily available. When $CF_2S$ is the comonomer, better yields of useful polymers are obtained if the ethylenically unsaturated monomer is free of conjugated carbon-carbon double bonds.

The hydrocarbylperoxyboron compounds that constitute one component of the redox system of this invention are the products obtained from the reaction of oxygen with a hydrocarbylboron compound represented by either of the formulas

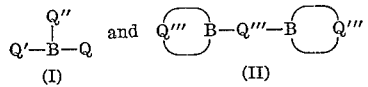

wherein each of Q, Q', and Q'', which may be the same or different, is alkyl of up to 18 carbons or cycloalkyl (includes unsubstituted cycloalkyl and alkyl-substituted cycloalkyl) of from 4 to 8 ring carbons and a total of up to 18 carbons, and Q''' is alkylene of from 4 to 8 carbons. Suitable hydrocarbylboron compounds corresponding to Formula I include, among others, triisopropylboron, tri-tert-butylboron, tri-n-hexylboron, tri-n-octylboron, tri-n-octadecylboron, tri(4 - ethylcyclohexyl) boron, tri(3-methylcyclopentyl)boron, tricyclohexylboron, tri[4-(n-hexyl)cyclohexyl]boron, tri[4 - (n-dodecyl)cyclohexyl] boron, tri-cyclooctylboron, n-dodecylmethyl-n-tetradecylboron, cyclopentylisobutyl-1-methylheptylboron and cyclooctyl-1-methylundecyl-n-octadecylboron.

Suitable hydrocarbylboron compounds which correspond to Formula II are exemplified by 1,6-bis(1-boracycloheptyl)-hexane; 1,4-bis(1-bora-3,4 - dimethylcyclopentyl)-2,3-dimethylbutane, 1,4-bis(1 - boracyclopentyl) butane; 1,4-bis(1-bora-3-methylcyclopentyl)-2-methylbutane; 1,4-bis(1-bora-2-methylcyclopentyl) - 1 - methylbutane; 1,5-bis(1-bora-2-methylcyclohexyl) - 1 - methylpentane; 1,6-bis(1-bora-3,6-dimethylcycloheptyl)-2,5-dimethylhexane; 1,5-bis(1-bora-2-n-propylcyclohexyl)-1-n-propylpentane; and 1,4-bis(1-bora-2-methyl-5-n-propylcyclopentyl)-1-methyl-4-n-propylbutane.

Because they are readily available, the preferred hydrocarbylperoxyboron compounds are those derived from the reaction of oxygen with the hydrocarbylboron compounds

described above. An especially preferred class, because of its availability and high effectiveness, consists of the compounds defined by the formula $A_2B-O-O-A$, where A is an alkyl group of 1–12 carbons.

The hydrocarbylmetal compound that functions as the reducing component of the redox system can be defined by the formula $Q_aMX_b'$, where Q is as defined above, M is a metal of Groups IA, IIA, IIIA, IVA, VA, IB, or IIB of the Periodic Table, X' is chlorine, bromine, or iodine, a is an integer and is at least 1, b is 0 or an integer, and $a+b$ is the valence of the metal. The designation of groups of the Periodic Table is that found on pages 394–5 of the "Handbook of Chemistry and Physics," 38th ed. (Chemical Rubber Publishing Company, 1956). It is to be understood that when more than one Q group is present, i.e., when $a>1$, the individual Q groups may be the same or different. The term "metal" is used here in the sense of Ephraim, "Inorganic Chemistry," Fourth ed., page 31 (Interscience Publishers, 1947). Suitable hydrocarbylmetal compounds include, for example, n-octadecyllithium, n-pentylpotassium, di-tert-butylberyllium, 2-decahydronaphthylmagnesium chloride, diethylbarium, the hydrocarbylboron compounds of column 5, dicyclohexylethylaluminum, ethylaluminum diiodide, tri-n-propylindium, trimethylgermanium bromide, di-n-dodecyltin dichloride, sec-butyldiethylmethyllead, tri-n-hexylarsenic, diethylgold bromide, di-n-hexadecylcadmium, and cyclopentylmercury chloride. A preferred class is that in which M is a metal of Group IIB or IIIA and b is 0. Because of availability and the convenience of using the same hydrocarbylmetal compound as the source of the hydrocarbylperoxyboron compound and as the reducing agent, an especially preferred class is that in which Q is an alkyl group of 1–12 carbons, M is boron, a is 3, and b is 0.

The amount of hydrocarbylperoxyboron compound can be varied considerably but will usually be between 0.001% and 10% by weight of the total amount of compound or compounds to be polymerized. Preferably it is between 0.02% and 2% by weight.

The amount of hydrocarbylmetal compound is governed by the amount of hydrocarbylperoxyboron compound. Between 0.1 mole and 10 moles of hydrocarbylmetal compound per mole of hydrocarbylperoxyboron compound can be used. The preferred amount is about two moles per mole of hydrocarbylperoxyboron compound.

The temperature of the reaction can be varied widely and is usually determined by the polymerization behavior of the compound or compounds to be polymerized. Temperatures between $-150°$ C. and $50°$ C. can be used. The process is preferably carried out at a temperature between $-100°$ C. and $10°$ C. A convenient temperature for carrying out many of the polymerizations and copolymerizations of this invention is approximately $-78°$ C., the temperature obtained by cooling with solid carbon dioxide.

The pressure is not critical and may vary from considerably less than atmospheric pressure to as high as several thousand atmospheres. Molecular oxygen should be excluded, however. The process is usually carried out in a closed system at the autogenous pressure of the reaction mixture.

A solvent is not required but may be used if desired. Solvents that can be used include aliphatic and cycloaliphatic hydrocarbons (e.g., pentane, methylcyclopentane, heptane, or petroleum ether) and halocarbons (e.g., dichlorodifluoromethane or hexafluoropropene). In some cases, an excess of the comonomers(s) above the amount required for copolymerization can be used as a solvent. An example of a comonomer that can be thus used is propylene. The amount of solvent may be varied widely but is usually from 0.5 to 10 times the total amount (parts by weight) of the compound or compounds to be polymerized. Since many of the components of the redox system are sensitive to air and may even spontaneously inflame therein, they are conveniently and usually handled as solutions in inert solvents such as heptane.

The order of addition of monomers and components of the initiating system is not critical. To make the most efficient use of the initiating system, it is desirable to add one component of this system last, especially if the reactants are being mixed within the operable temperature range. If the comonomer is basic enough to act as an anionic initiator (or coinitiator) of polymerization of the thiocarbonyl compound, it is preferred to have the hydrocarbylmetal compound present before the thiocarbonyl compound and the comonomer are brought into contact. An example of a comonomer that is basic enough to cause anionic polymerization is allylidene acetate, $$CH_2=CH-CH(OCOCH_3)_2$$

Polymerization begins immediately when the monomer or monomers and the components of the initiating system come into mutual contact in the operable temperature range. It can be complete within a few minutes or require as long as 16 hours, depending on such factors as the monomer or comonomers, the components of the redox system and their concentrations, and the temperature. Usually the polymerization proceeds to practical completion within one to five hours, and thus a time within this range is preferred.

In polymerizations involving more than one monomer, the weight ratio of one compound to be polymerized to the other(s) can be varied widely depending in part on the properties desired in the product. Generally no one monomer will constitute less than 1% by weight of the monomer mixture, and preferably no less than 5% by weight of said mixture. Copolymerization of about 10 parts of a polymerizable, ethylenically unsaturated monomer with about 90 parts of thiocarbonyl fluoride by the process of this invention gives a copolymer which, in contrast to polythiocarbonyl fluoride, does not crystallize at low temperatures; and is more resistant to high-temperature degradation, is more susceptible to after-treatments, and has better rheological properties than polythiocarbonyl fluoride. Copolymerization of about 15 parts of a suitable thiocarbonyl compound with about 85 parts of ethylene gives a noncrystalline, elastomeric copolymer in contrast to nonelastomeric, crystalline polyethylene. Similar copolymerizations of thiocarbonyl compounds with vinyl acetate or vinyl chloride give products that have distinctly different adhesive properties from those of the vinyl homopolymers.

The course of the polymerization reaction can be followed, and the point of completion determined, in several ways. For example, many thiocarbonyl monomers have characteristic colors, and their polymerization or copolymerization can be followed by the gradual disappearance or change of this color. In some cases the polymeric products separate as solids from the liquid mixtures. In still other cases the mixture remains liquid but increases markedly in viscosity as the polymerization proceeds.

The polymeric product is conveniently isolated by adding to the mixture an excess of a nonsolvent for the polymer, separating the polymer that precipitates or is already present, washing the product, and drying. The order of the first two steps can be reversed if desired. The washing step removes initiator residues. Typical nonsolvents are alcohols such as methyl alcohol or ethyl alcohol and hydrocarbons such as hexane or petroleum ether.

The compounds used in the process of this invention can be prepared as follows:

Thiocarbonyl fluoride and thiocarbonyl chlorofluoride can be prepared by the pyrolysis of tetrafluoro-1,3-dithietane and chlorotrifluoro-1,3-dithietane, respectively, as described in U.S. 2,980,695.

α-Fluorothioacyl fluorides, e.g., trifluorothioacetyl fluoride, can be prepared by removal of the elements of hydrogen fluoride from α-fluoroalkanethiols, as described in French Patent 1,247,137.

Fluorinated thioacyl chlorides, e.g., trifluorothioacetyl chloride, are prepared by the reaction of suitable chlorofluoroalkanes with sulfur, as described in U.S. Patent No. 3,113,936.

Fluorothioketones containing at least two fluorine atoms on each carbon attached directly to thiocarbonyl carbon, e.g., perfluorothioacetone, are prepared by the reaction of a di(fluoroalkyl)mercury with phosphorus pentasulfide, as described in U.S. Patent No. 2,970,173; and α-fluorothioketones (ketones containing fluorine atoms on only one carbon attached directly to thiocarbonyl carbon) are prepared by the thermal decomposition of fluorine-containing gem-dithiols or gem-olthiols, e.g., 1,1,1-trifluoro-2-mercaptopropanol to yield methyl perfluoromethyl thioketone, as described in U.S. Patent No. 3,069,397.

Thiocarbonyl chlorocyanide and thiocarbonyl fluorocyanide are prepared by reacting sulfur with, e.g., trichloroacetonitrile and chlorofluoroacetonitrile, respectively, at a temperature of about 600° C., as described in U.S. Patent No. 3,026,304.

The hydrocrabylboron compounds of Formula I, supra, are either commercially available or are readily prepared by conventional prior art techniques. The hydrocarbylboron compounds of Formula II, supra, are prepared by reacting diborane with the appropriate diene in the manner disclosed by K. A. Saegebarth, J. Am. Chem. Soc., 82, 2081 (1960). For example, 1,6-bis(1-boracycloheptyl)hexane (A) is prepared by reacting 1,5-hexadiene with diborane; and 1,4-bis(1-bora-3,4-dimethylcyclopentyl) - 2,3 - dimethylbutane (B) is prepared by the same method from 2,3-dimethylbutadiene and diborane.

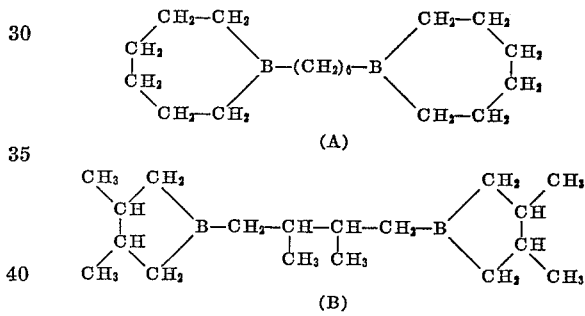

The hydrocarbylperoxyboron compounds are readily prepared by the reaction of a hydrocarbylboron compound of Formula I or Formula II wtih molecular oxygen at a temperature between about −140° C. and 40° C. and a pressure of up to about three atmospheres. A solvent is not required, but it is advantageous to use an inert solvent to permit better control of the reaction and to help maintain fluidity of the reaction mixture. Suitable solvents are hydrocarbons such as pentane, isohexane, heptane, and petroleum ether. Although only one mole of oxygen per mole of hydrocarbylboron compound is required, an excess of oxygen is usually employed in order to insure complete consumption of the hydrocarbylboron compound. Temperatures between about −100° C. and 0° C. are preferred, since in this range the reaction is rapid, fluidity of the reaction mixture is easy to maintain, and decomposition of the product is negligible. An especially convenient temperature is about −78° C., the temperature obtained by cooling with solid carbon dioxide. The preferred pressure range is about 0.5 to 2 atmospheres. When the process is carried out in a closed system, which is the preferred method of operation, the progress of the reaction is easily followed by noting the drop in pressure due to reaction of the oxygen.

The following examples illustrate the process of this invention.

EXAMPLE 1

A glass reactor equipped with a stirrer, a means of measuring pressure, and means of adding and removing gases and liquids without atmospheric contamination was purged with nitrogen and charged with 6.8 g. of heptane and 0.091 g. of tri-n-butylboron (0.5 ml. of a heptane solution containing 5×10⁻⁴ mole of tri-n-butylboron per ml.). The mixture was stirred throughout the process. The reactor was cooled to −78° C. and partially evacuated, and 24 cc. of gaseous oxygen was introduced. The degree of evacuation was such that the system was returned to approximately atmospheric pressure by the addition of the oxygen. The mixture was kept at −78° C. for 30 minutes. The system was then purged of excess oxygen by evacuating to less than 1 mm. pressure, admitting nitrogen to atmospheric pressure, and repeating this procedure three times. The solution of di(n-butyl)-(n-butylperoxy)boron thus obtained was cooled to −190° C., and about 7.5 g. of thiocarbonyl fluoride was added. The mixture was warmed to −78° C. and stirred at this temperature for one hour. There was no evidence of polymerization during this time. Tri - n - butylboron (0.091 g.) (0.5 ml. of a heptane solution containing 5×10⁻⁴ mole of tri-n-butylboron per ml.) was added. The mixture soon became turbid, which showed that polymerization had begun essentially at once, and after 50 minutes the contents of the reactor had solidified. The solid product was removed, agitated vigorously with excess methanol, and dried under vacuum at room temperature. There was obtained 7.5 g. of polythiocarbonyl fluoride, which was pressed to an elastomeric, transparent film at 100° C.

EXAMPLE 2

Example 1 was essentially repeated, triethylboron being used in place of tri-n-butylboron. The product was 7.2 g. of polythiocarbonyl fluoride.

EXAMPLE 3

*Preparation of diethyl(ethylperoxy)boron*

A 50-ml. glass reactor, protected from atmospheric contamination and containing a solution of 0.294 g. (30×10⁻⁴ mole) of triethylboron in 20 ml. of heptane, was cooled to −78° C. and evacuated to a pressure of less than 1 mm. The liquid was stirred throughout. Gaseous oxygen was admitted to the free space above the liquid until the total pressure of the system reached about 1,000–1,300 mm. (atmospheric pressure=760 mm.). Reaction of the oxygen with the triethylboron began immediately, as indicated by a pressure drop. The system was repressured periodically with gaseous oxygen as above until there was no further pressure drop (about 10 minutes). The system was kept under a positive pressure of oxygen at −78° C. for a total of 30 minutes to insure complete reaction. It was then purged of excess oxygen by evacuating to less than 1 mm. pressure, admitting nitrogen to atmospheric pressure, and repeating this procedure three times. The peroxide-containing solution was stored at −78° C. under nitrogen. An iodide-thiosulfate titration of a sample of the product showed the presence of 1.4×10⁻⁴ mole of peroxide per ml., corresponding to an essentially complete conversion of triethylboron to diethyl(ethylperoxy)boron.

This solution, and similar solutions of other hydrocarbylperoxyboron compounds, can be stored, preferably at about −78° C., and samples can be used for polymerization experiments as desired, for example, as in the following procedure.

*Use of diethyl(ethylperoxy)boron as a coinitiator of polymerization*

A glass reactor of the type used in Example 1 was purged with nitrogen, cooled to −190° C., and charged with 0.026 g. of diethyl(ethylperoxy)boron (heptane solution prepared as described above), 0.93 g. of vinyl acetate, 21 g. of dichlorodifluoromethane, and 6.7 g. of thiocarbonyl fluoride. The mixture was warmed to −78° C., and 0.079 g. of triisobutyl-aluminum dissolved in one ml. of heptane was charged with stirring. Polymerization began essentially immediately, and a white solid soon began to precipitate. After four hours and 52 minutes, the solid product was worked up by the method of Example 1 to give 5.76 g. of a thiocarbonyl fluoride/vinyl acetate copolymer containing 35.47% sulfur, which corresponded to 91% by weight of combined thiocarbonyl fluoride. A clear, colorless, tough film was pressed from the product at 100° C. A stretched strip of this film did not crystallize at 0° C.

EXAMPLE 4

A glass reactor of the type used in Example 1 was purged with nitrogen, cooled to −78° C., and charged with 60 g. of propylene. The liquid was stirred throughout the process. The reactor was cooled to −190° C. and charged with 13.3 g. of thiocarbonyl fluoride and 0.6 g. of ethoxydimethylvinylsilane. The mixture was warmed to −78° C., and 0.052 g. of diethyl(ethylperoxy)boron dissolved in heptane (prepared as in Example 3) and 0.039 g. of triethylboron dissolved in 0.4 ml. heptane were added. Polymerization began essentially immediately, and polymer began to precipitate within 10 minutes. After 3.5 hours, the product was worked up by the method of Example 1 to give 18.1 g. of a thiocarbonyl fluoride/propylene/ethoxydimethylvinylsilane terpolymer (approximately 76/21/3 by weight).

EXAMPLE 5

A glass reactor of the type used in Example 1 was purged with nitrogen, cooled to −190° C., and charged with 5.5 g. of 2,3-dichloro-1,3-butadiene and 4.5 g. of thiocarbonyl chlorofluoride. It was warmed to 0° C., and 0.052 g. of diethyl(ethylperoxy)boron (heptane solution, prepared as in Example 3) was added with stirring, followed by 0.078 g. of triethylboron dissolved in 0.41 ml. of heptane. On addition of the triethylboron, polymerization occurred essentially instantaneously and completely, as evidenced by immediate solidification of the mixture. The product was worked up by the method of Example 1 to give 7.75 g. (there was some mechanical loss) of a thiocarbonyl chlorofluoride/2,3-dichloro-1,3-butadiene copolymer containing about 31% by weight of combined thiocarbonyl chlorofluoride. A slightly tacky film was pressed from this product at 100° C.

EXAMPLE 6

A glass reactor of the type used in Example 1 was purged with nitrogen, cooled to −190° C., and charged with approximately 3 g. of trifluorothioacetyl fluoride. The mixture was stirred as long as possible throughout the process. It was warmed to −78° C., and 0.052 g. of diethyl(ethylperoxy)boron (heptane solution, prepared as in Example 3) was added, followed by 0.078 g. of triethylboron dissolved in 0.41 ml. of heptane. Polymerization was apparently complete within 1 hour and 45 minutes, within which time the mixture solidified and stirring became impossible. After four hours, the product was worked up by the method of Example 1 to give 3.15 g. of poly(trifluorothioacetyl fluoride).

*Analysis.*—Calcd. for $(C_2F_4S)_x$: S, 24.2. Found: S, 24.68.

A tough, elastomeric film was pressed from the product at 100° C.

EXAMPLES 7–19

Other polymerizations that exemplify the process of this invention are summarized in Table I. In each of Examples 7–19, the hydrocarbylperoxyboron compound was taken from a stock solution prepared by the method of Example 3, the polymerization temperature was −78° C., and methanol was the washing liquid unless noted otherwise in the "Remarks" column. The time in each example is the time that was allowed to elapse between addition of the last component of the system and workup of the product, and is therefore not necessarily an exact measure of the speed of the reaction.

TABLE I

| Ex. No. | Grams Redox components [1] | Grams monomer(s) | Gms. solvent (In addition to Heptane used for Redox Components) | Time, hrs.:min. | Gms. product | Wt. percent Thiocarbonyl Compound in Copolymer or Terpolymer | Remarks |
|---|---|---|---|---|---|---|---|
| 7 | 0.026 Et$_2$BOOEt, 0.049 Et$_2$Zn. | 6 CF$_2$=S | None | 0:50 | 1.1 | | Mixture had solidified after 0:12. |
| 8 | 0.026 Et$_2$BOOEt, 0.072 Et$_2$Cd. | 6.7 CF$_2$=S | 21 CF$_2$Cl$_2$ | 16:00 | 3.0 | | |
| 9 | 0.052 Et$_2$BOOEt, 0.078 Et$_3$B. | Ca. 13.5 CF$_2$=S, 0.4 ethoxy-dimethylvinylsilane. | 150 CF$_2$Cl$_2$ | 4:00 | 13.9 | | Ethanol wash; copolymer gave tough, transparent film. |
| 10 | 0.075 Et$_2$BOOEt, 0.11 Et$_3$B. | 13.3 CF$_2$=S, 0.4 vinyl acetate, 0.1 ethoxy-dimethylvinylsilane. | 150 CF$_2$Cl$_2$ | 18:00 | 11.45 | 96 | Ethanol wash. |
| 11 | 0.052 Et$_2$BOOEt, 0.039 Et$_2$B. | 13.3 CF$_2$=S, 60 propylene | See remarks | 4:00 | 18.1 | 75 | Excess propylene functioned as solvent; copolymer gave tough film. |
| 12 | 0.052 Et$_2$BOOEt, 0.039 Et$_3$B. | 6.7 CF$_2$=S, 0.4 vinyl-acetyl chloride. | 3.4 heptane | 3:00 | 4.0 | | Polymerization complete in 1:40. |
| 13 | 0.22 Do$_2$BOODo, 0.44 Do$_3$B. | 6.7 CF$_2$=S | 6.8 heptane | See Remarks | 5.59 | | Polymer precipitated immediately. |
| 14 | 0.052 Et$_2$BOOEt, 0.078 Et$_3$B. | 4.5 CClF=S, 6.1 propylene | None | 1:30 | 4.47 | 94 | |
| 15 | 0.052 Et$_2$BOOEt, 0.078 Et$_3$B. | 6.65 CF$_2$=S, 6.0 CClF=S | do | 3:50 | 6.35 | [2] 71.5 | |
| 16 | 0.052 Et$_2$BOOEt, 0.078 Et$_3$B. | 5.2 CClF=S | 4.8 heptane | 2:50 | 4.52 | | |
| 17 | 0.052 Et$_2$BOOEt, 0.078 Et$_3$B. | 2.25 CF$_3$CF=S, 3.0 propylene | None | 2:10 | 2.0 | 90 | Mixture had solidified by 0:50. Elastomeric film pressed from product at 100° C. |
| 18 | 0.020 Et$_2$BOOEt, 0.035 Et$_3$B. | 2.7 CF$_2$=S, 0.55 allyl chloroformate. | 5.6 CF$_2$Cl$_2$ | (Overnight) | | | Et$_2$BOOEt preformed in place as in Example 2. Petroleum ether wash. Copolymer tough, elastomeric, and soluble in chloroform. |
| 19 | 0.023 Et$_2$BOOEt, 0.039 Et$_3$B. | 42.7 CF$_2$=S, 36.4 propylene, 7.7 allyl chloroformate. | None | (Vigorous reaction complete in 0:01). | 16.0 | [3] 79.7 | Same as Example 18. |

[1] Et=ethyl, Do=n-dodecyl. [2] CF$_2$S. [3] Propylene, 14.1; allyl chloroformate, 6.2.

Additional ethylenic comonomers whose polymerizations with thiocarbonyl monomers are initiated by the redox system of this invention are ethylene, 1-butene, 2-butene, 1-hexene, tetramethylethylene, isobutylene, cyclohexene, vinylcyclohexane, 1,4-hexadiene, 1,5-hexadiene, 5-methylene-bicyclo[2.2.1]-2-heptene, styrene, vinyl chloride, vinyl fluoride, 2-chloropropene, vinylidene fluoride, 1,1-dichloro-2,2-difluoroethylene, allyl chloride, 4,4,4-trichloro-1-butene, tetrafluoroethylene, hexafluoropropylene, cyclohexyl vinyl ether, 3,3-diethoxypropene, 4-acetoxy-1-butene, allyl n-butyrate, ethyl acrylate, allyl benzoate, vinyl propionate, allylidene acetate, methyl methacrylate, 2-chloroethyl acrylate, allyl acetate, isopropenyl acetate, 3-pentenenitrile, acrylonitrile, vinyltrimethylsilane, 1,1-dimethylallyl isocyanate, allyl isothiocyanate, allyl 1,1,2,2-tetrafluoroethyl ether, allyl β-methoxypropionate, α-acetoxyacrylonitrile, allyl perfluorobutyrate, and 2,3-epoxypropyl methacrylate. The polymerization of any of these ethylenically unsaturated monomers with thiocarbonyl compounds by the process of this invention is easily effected simply by following the procedures set forth in Examples 4 or 5.

Because it permits instantaneous, complete mixing of initiator components and precise control of their concentrations, the process of this invention provides a method of making polymers of thiocarbonyl compounds, including homopolymers and polymers of thiocarbonyl compounds with other thiocarbonyl compounds and with ethylenically unsaturated compounds, that is reproducible and free of retardation, and that is not provided by any other known process. This is illustrated by the comparative experiments in Table II on the copolymerization of thiocarbonyl fluoride and vinyl acetate. In each experiment, a reactor of the type used in Example 1 was purged with helium, charged with dichlorodifluoromethane at −78° C., and charged with CF$_2$S at −190° C. The mixture was warmed to the melting point of the charge and degassed by evacuation. Vinyl acetate was charged at −78° C. In the first four experiments, triethylboron and gaseous oxygen were then charged at −78° C. in the stated order; in the last three experiments, diethyl-(ethylperoxy)boron and triethylboron. All polymerizations were run at −78° C. for from five to six hours. The products were worked up by the method of Example 1. The results show clearly that the initiating system of this invention gave higher conversions and more reproducible results (last three runs) than the systems involving gaseous oxygen (first four runs).

TABLE II

| Gms. CCl$_2$F$_2$ | Gms. CF$_2$S | Gms. Vinyl Acetate | Gms. Et$_2$BOOEt | Gms. Et$_3$B | Gms. O$_2$ | Gms. Polymer | Percent Conversion | Remarks |
|---|---|---|---|---|---|---|---|---|
| 40 | 12 | 0.9 | | 0.029 | 0.0075 | 1 | 8.5 | |
| 48 | 12 | 0.9 | | 0.029 | 0.0039 | 2.9 | 22 | |
| 48 | 12 | 0.9 | | 0.046 | 0.0019 | 8.8 | 68 | |
| 40 | 12 | 0.9 | | 0.034 | (None) | Trace | ca. 0 | |
| 400 | 40 | 10.2 | 0.074 | 0.146 | | 45.4 | 90.5 | Polymerization began immediately on addition of Et$_3$B. |
| 480 | 51 | 4.0 | 0.086 | 0.149 | | 55 | 100 | Do. |
| 480 | 53 | 4.5 | 0.083 | 0.149 | | 50 | 87.5 | Do. |

Polymers prepared by the process of this invention are useful for the purposes for which such polymers have previously been employed. As is apparent from the above examples, homopolymers and many copolymers prepared by the novel process of this invention can be formed into tough and often elastomeric articles such as films by conventional techniques. Thus, these polymers can take the form of fused coatings or self-supporting films for protective packaging, or can be shaped into articles such as flexible tubing. Some copolymers prepared by the process of this invention may be used to construct tough plastic articles by injection or compression molding. Still other copolymers are tacky and thus are useful as adhesives, e.g., for wood, metal foil, etc.

Since obvious modifications and equivalents in the invention will be evident to those skilled in the chemical arts, I propose to be bound solely by the appended claims.

The embodiments of the invention in which an exclusive property or privilege is claimed are defined as follows:

1. In a process for the polymerization, at a temperature in the range −150° C. to 50° C. and in the substantial absence of molecular oxygen, of (A) a thiocarbonyl compound of the formula $$\underset{\text{R}-\overset{\text{S}}{\underset{\|}{\text{C}}}-\text{R}'}{}$$

wherein:

R is selected from the group consisting of fluorine, chlorine and when R' is other than cyano,

R' is selected from the group consisting of fluorine,

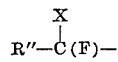

cyano and alkyl of 1–7 carbons;

R'' is selected from the group consisting of hydrogen, fluorine, chlorine and alkyl and polyhaloalkyl of 1–6 carbons, all halogen being of atomic number 9–17; and X is halogen of atomic number 9–17; with (B) at least one member of the group consisting of a thiocarbonyl compound of the aforementioned formula and an ethylenically unsaturated compound:

the improvement which comprises initiating the polymerization with a redox system comprising:

(1) a preformed hydrocarbylperoxyboron compound prepared by reacting oxygen with a hydrocarbylboron compound of the group consisting of

wherein each of Q, Q' and Q'' contains up to 18 carbons and is selected from the group consisting of alkyl and cycloalkyl of 4–8 ring carbons and Q''' is alkylene of 4–8 carbons; and (2) a hydrocarbylmetal compound of the formula $Q_aMX_b'$, wherein Q is as defined above, M is a metal of Groups IA, IIA, IIIA, IVA, VA, IB and IIB of the Periodic Table, X' is a halogen of atomic number 17–53, a is an integer and is at least 1 and the sum of a and b is the valence of M.

2. The process of claim 1 employing a temperature in the range −100° C. to 10° C.

3. The process of claim 1 employing thiocarbonyl fluoride.

4. The process of claim 1 employing a di(lower alkyl) (lower alkyl-peroxy)boron.

5. The process of claim 1 employing a tri(lower alkyl) boron.

6. The process of claim 1 employing a tri(lower alkyl) aluminum.

7. The process of claim 1 employing a di(lower alkyl) zinc.

8. The process of claim 1 employing a di(lower alkyl) cadimum.

9. The process of claim 1 constituting a homopolymerization.

10. The process of claim 1 constituting a copolymerization.

11. The process of claim 10 employing an ethylenically unsaturated hydrocarbon.

12. The process of claim 10 employing an ethylenically unsaturated chlorinated hydrocarbon.

13. The process of claim 10 employing an ethylenically unsaturated fluorinated hydrocarbon.

14. The process of claim 10 employing an acrylate monomer.

15. The process of claim 10 employing an allyl ester.

16. The process of polymerizing thiocarbonyl fluoride which comprises contacting the same, at a temperature in the range −150° C. to 50° C. and in the substantial absence of molecular oxygen, with a redox system comprising a di(lower alkyl)(lower alkyl-peroxy)boron and a tri(lower alkyl)boron.

17. The process of copolymerizing thiocarbonyl fluoride and vinyl acetate which comprises contacting a mixture of the same, at a temperature in the range −150° C. to 50° C. and in the substantial absence of molecular oxygen, with a redox system comprising a di(lower alkyl) (lower alkyl-peroxy)boron and a tri(lower alkyl)aluminum.

18. The process of copolymerizing thiocarbonyl chlorofluoride and 2,3-dichloro-1,3-butadiene which comprises contacting a mixture of the same, at a temperature in the range −150° C. to 50° C. and in the substantial absence of molecular oxygen, with a redox system comprising a di(lower alkyl)(lower alkyl-peroxy)boron and a tri(lower alkyl)boron.

19. The process of polymerizing trifluorothioacetyl fluoride which comprises contacting the same, at a temperature in the range −150° C. to 50° C. and in the substantial absence of molecular oxygen, with a redox system comprising a di(lower alkyl)(lower alkyl-peroxy) boron and a tri(lower alkyl)boron.

20. The process of copolymerizing thiocarbonyl fluoride and allyl chloroformate which comprises contacting a mixture of the same, at a temperature in the range −150° C. to 50° C. and in the substantial absence of molecular oxygen, with a redox system comprising a di(lower alkyl)(lower alkyl-peroxy)boron and a tri(lower alkyl)boron.

References Cited by the Examiner

UNITED STATES PATENTS

| | | | |
|---|---|---|---|
| 2,980,695 | 4/61 | Middleton | 260—79 |
| 2,985,633 | 5/61 | Welch | 260—85.3 |
| 3,009,972 | 11/61 | Johnson | 260—606.5 |

LEON J. BERCOVITZ, *Primary Examiner.*

WILLIAM H. SHORT, *Examiner.*